June 8, 1954 A. HARNISCH 2,680,838
METHOD AND APPARATUS FOR INTEGRATING MEASURING
VALUES VARIABLE WITH THE TIME
Filed Feb. 5, 1952 2 Sheets-Sheet 1
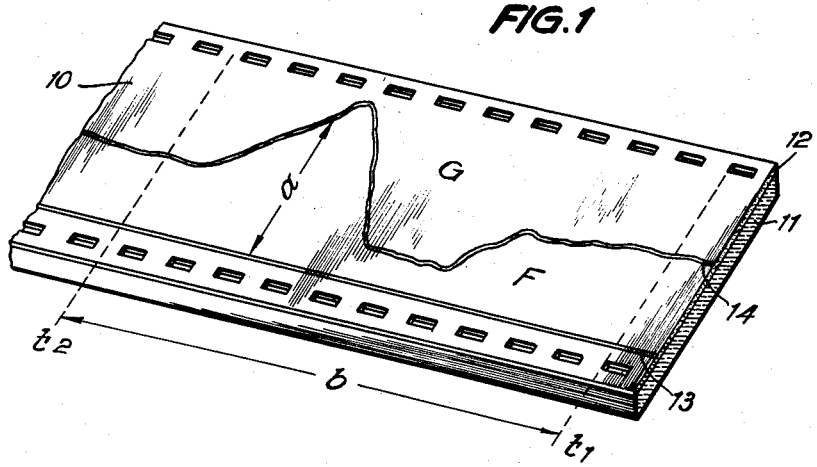
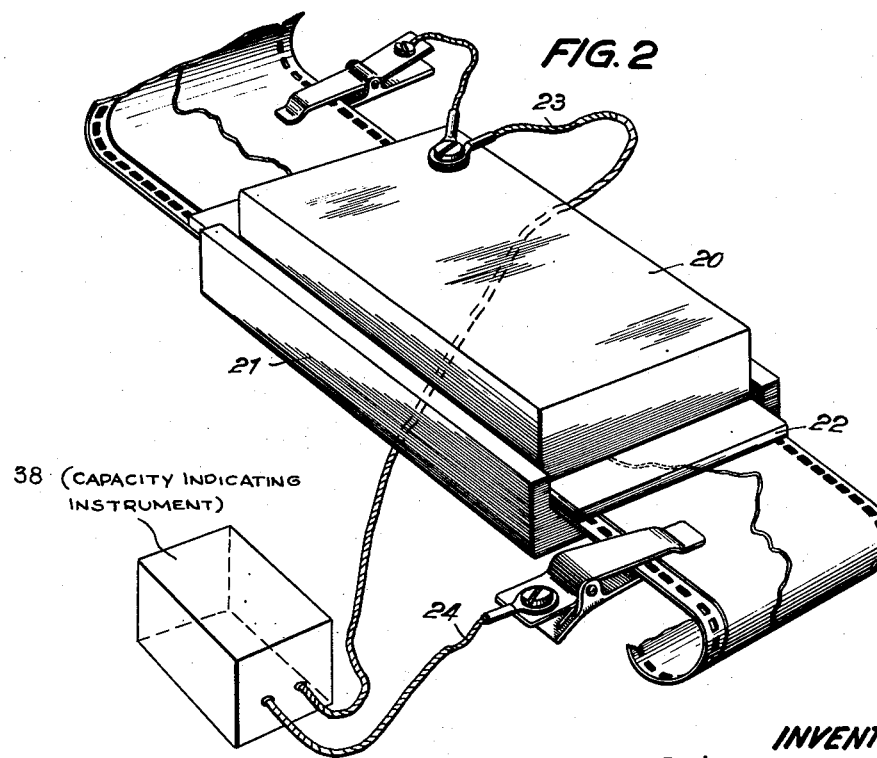
INVENTOR
Alfred Harnisch
by
Stevens, Davis, Miller & Mosher
his attorney June 8, 1954  A. HARNISCH  2,680,838
METHOD AND APPARATUS FOR INTEGRATING MEASURING
VALUES VARIABLE WITH THE TIME
Filed Feb. 5, 1952  2 Sheets-Sheet 2

INVENTOR
Alfred Harnisch
by
Stevens, Davis, Miller & Mosher
his attorneys

Patented June 8, 1954

2,680,838

UNITED STATES PATENT OFFICE 2,680,838

METHOD AND APPARATUS FOR INTEGRATING MEASURING VALUES VARIABLE WITH THE TIME

Alfred Harnisch, Stuttgart, Germany, assignor to Robert Bosch G. m. b. H., Stuttgart, Germany Application February 5, 1952, Serial No. 270,003

Claims priority, application Germany February 17, 1951

6 Claims. (Cl. 324—60)

This invention relates to a method and apparatus for integrating values varying with the time which are recorded in such a way that a metal coating applied on a carrier of insulating material is removed along a track which is produced preferably by burning out, whereby the metal coating is divided into at least two partial areas which are insulated from each other, the contours of these areas being formed by the recorded curve.

As is well known, such a track can be produced in such a way that the record carrier consisting of the insulating strip and the metal coating is moved under a recording electrode contacting the metal coating, while the metal coating and the electrode are connected to a source of current of a voltage sufficient to cause burning away of the metal coating at the point of contact and to produce a continuous record. If the recording electrode or stylus is deflected transversely to the direction of travel of the record carrier in proportion to the size of the measured value to be recorded, the record will represent the temporal course of the measured values.

It is an object of the present invention to provide means, in an apparatus of the type referred to, for integrating the measured values during a predetermined temporal interval, i. e., through a predetermined length of the record carrier, in a simple, quick, and reliable manner.

With this object in view, according to the present invention at least one of the partial areas of the metal coating separated by the recording track is opposed to an electrically conductive auxiliary electrode so as to form together therewith an electric condenser whose capacity can be measured according to any suitable method in order to determine the area of the partial surface.

Other and further objects, features and advantages of the invention will be pointed out hereinafter and appear in the appended claims forming part of the application.

In the accompanying drawings several now preferred embodiments of the invention are shown by way of illustration and not by way of limitation.

Figure 3:
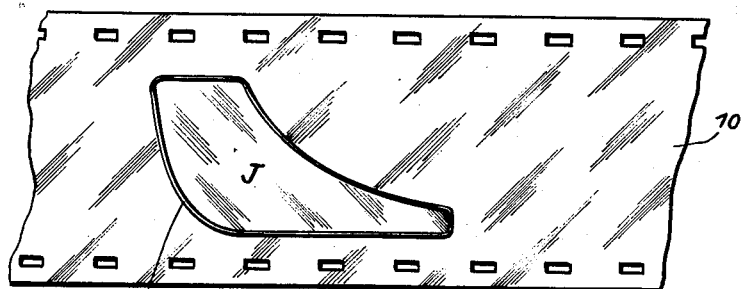
Figure 4:
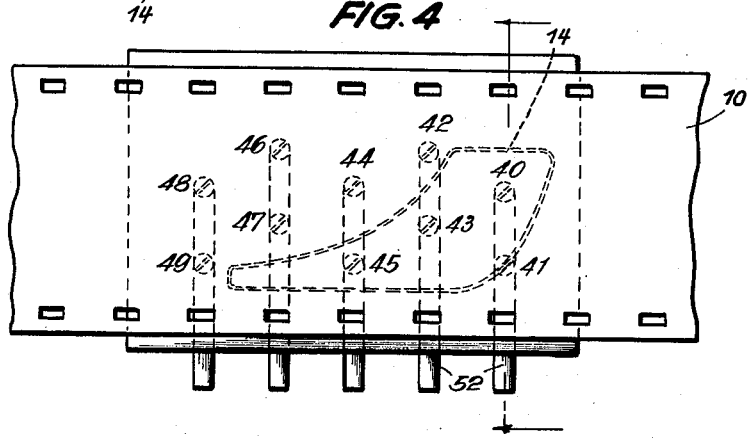
Figure 5:
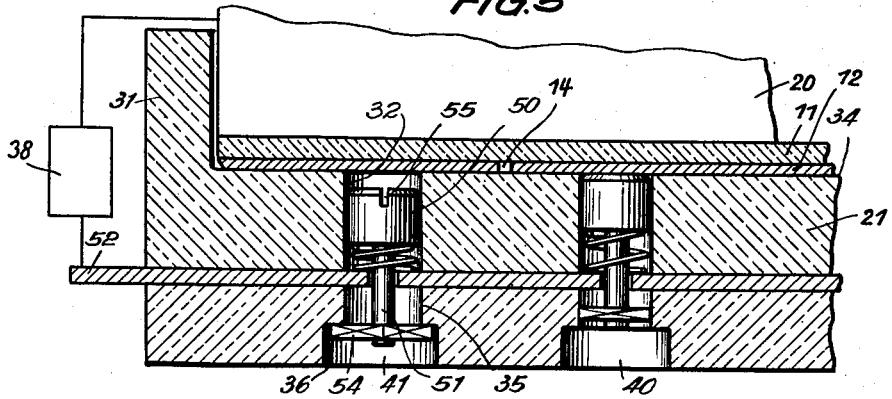

Fig. 1 is a perspective view of a record carrier with a burnt out recording track, the layers being greatly enlarged in thickness, Fig. 2 is a perspective view of a measuring device for carrying out the method according to the invention, Fig. 3 is a plan view of another record carrier showing an indicator diagram, Fig. 4 is a plan view of a part of a modified measuring device with a record carrier inserted, and Fig. 5 is a section on line V—V of Fig. 4.

Similar reference numerals denote similar parts in the different views.

Referring now to the drawings in greater detail and first to Fig. 1, it will be seen that the record carrier 10 consists of an insulating tape or strip 11 of a thickness of about 30 microns and a metal coating 12 of a thickness of 0.1 micron, of a zinc-cadmium alloy deposited on the insulating strip from the vapor phase in an originally coherent form. The record carrier 10 has been passed through an input recorder operating in the manner above referred to and has advanced between the points of time $t_1$ and $t_2$ indicated by the dotted lines, by the length $b$, whereby a recording track 14 has been burnt out of its metal coating 12, whose actual distance $a$ from a reference line 13 corresponds to the instantaneous values of an input of a consumer (not shown) measured in kilowatts or watts. Through the recording track 14 the area of the metal coating 12 available for the recording is divided into two electrically separated partial areas F and G defined, in the range intended to be worked up, by the lines $t_1$ and $t_2$. The area of the partial surface F represents the integral of the input in the interval from $t_1$ to $t_2$, i. e., for instance, the consumption in terms of kilowatt-hours. In order to ascertain the same, the partial surface F according to Fig. 2 is opposed to the underside of a metal plate 20. To this end the record carrier 10 is put into an insulating body 21, with the metal layer 12 facing upwards, covered with a transparent foil 22 of polystyrol, of a thickness of about 10 microns, and then covered with the metal layer 20. In this way an arrangement is obtained which acts as an electric condenser with several partial capacities whose amount is determined, apart from the polystyrol foil acting as a common dielectric, only by the areas of the partial surfaces of the metal coating which are covered by the metal plate 20. The width of the recess in the insulating body 21 as well as that of the polystyrol foil 22 and of the metal plate 20 are adapted to the width of the record carrier 10. The length of the metal plate 20 corresponds to the feed $b$ of the record carrier 10 which has taken place during the period from $t_1$ to $t_2$.

The metal plate 20 and the partial surface F are connected by conductors 23 and 24, respectively, to the terminals of a known measuring bridge and the capacity $C_1$ is measured. In order to eliminate errors, the rest of the metal coating 12 is electrically connected to the metal plate 20 during this measurement. In a similar manner the capacity $C_2$ of both partial surfaces taken together is measured. The area H of the rectangular total surface formed by the two partial surfaces F and G can easily be measured directly.

The area F to be determined accordingly amounts to $$F = \frac{H}{C_2} \cdot C_1$$

This area F indicates the consumption in the period of time $t_1$ to $t_2$, with due consideration of the rules of time and output used during the recording, and the temporal average value of the input can immediately be computed therefrom.

Especially in case of larger series of measurements it may be advisable to gage the measuring bridge directly in the units of the values to be shown by the surface F instead of, or in addition to, the capacity values.

For the accuracy of the method it is extremely important that the bearing-surface area for the record carrier 10 in the insulating body 21 and the bearing-surface area of the metal plate 20 are parallel to each other. The foil 22 of insulating material serving as a dielectric may be fixedly secured on the metal plate 20. At any rate it should be of uniform thickness and as thin as possible, in order that the metal coating 12 and the metal plate 20 serving as an auxiliary surface form a capacity which is as large as possible so that the inevitable errors owing to auxiliary capacities of the circuit and the like can be neglected or easily eliminated.

It will be understood that it is also possible to use the strip 11 of insulating material itself as a dielectric and to put the metal layer 12 of the record carrier 10 onto the insulating body 21 while the non-metallised side abuts the metal plate 20. This method is preferably applied where, as in the case of the indicator diagram of Figs. 3 and 4, the feed has not taken place at a uniform rate of speed but indicates a physical value which is also varying with the time, and where the partial surface J of the metal coating to be measured is entirely enclosed by the recording track 14. In this case the rest of the area of the record carrier 10 is electrically separated from the measuring surface J. The connection of the surface to be measured in this case is advantageously achieved by means of at least one out of several spring-urged connection pins 40–49 adjustably arranged in recesses in the insulating body, as shown in Figs. 4 and 5. The connecting pins 40 to 49 are distributed over the bearing surface 34 for the record carrier 10 in the insulating body 21 in such a way that at least one of them in a connected condition contacts with the partial surface J of the metal coating 12 which is to be measured, while by no means electrically connecting said surface area with the rest of the surfaces of the metal coating 12. According to Fig. 5 the connection pins are provided with a cylindrical contact head 50 which is guided in a bore 32 of the upper part 31 of the insulating body and through a light compression spring is electrically connected to a leading-in strip 52. The shank 51 is fixedly connected on one hand with the contact head 50, on the other hand with a square plate 54. In the position as shown the connecting pin 41 is disconnected, because the square plate 54 cannot enter into the square-shaped recess 35 in the upper part 31 of the insulating body and thus retains the contact head 50 below the level of the bearing surface 34 for the record carrier 10.

Before inserting the record carrier 10 whose thickness for the sake of clarity has been greatly exaggerated in Fig. 5, at least one of the connecting pins 40, 43, 45, and 49 is selected for the connection, while the remaining pins are moved into their inoperative position as shown with reference to the pin 41. To this end, the blade of a screw driver is introduced into a slot 55 provided in the contact head 50, depressed, and turned through about 45°. The area J to be measured is connected to the measuring bridge 38 by means of the connecting strip 52 connected to the contacting pin 40.

It will be understood that it is also possible to use the device consisting of a metal plate 20 and an insulating body 21 in a modified form so that the metal plate 20 is at the bottom and serves as a bearing surface for the record carrier 10 whose upwardly directed metal coating 12 is covered by the insulating body 21. For this arrangement an insulating body 21 of transparent material, such as, e. g., an artificial glass material known under the trade name "Plexiglas," polystyrol, or the like, is particularly suitable, in which at least one connecting pin of the kind described is arranged. Such an insulating body also permits the connection of very small surfaces without damaging the metal coating.

The method according to the invention can also be used to work up several curves of measuring values arranged side by side on a common record carrier and showing physical quantities which are independent of each other. In this case it may be advisable in the recording to displace one or several curves of measuring values by a fixed constant amount, in order to avoid too frequent intersection of the curves of the different measuring values and the production of a multitude of small partial areas whereby the working-up would be rendered difficult.

It is also contemplated, within the purview of the present invention, to measure directly the quotient $$F = \frac{H}{C_2} \cdot C_1$$

by a suitable connection of the partial condensers and by using a suitable measuring bridge.

The method according to the invention is also particularly suitable for measuring peak consumption values, in which case only the areas lying above a predetermined calculated value are measured.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed is:

1. A method of integrating a curve varying with time between the values of time $T_1$ and $T_2$, said curve being carried by a metal coated record and dividing said record electrically into at least two separate areas, namely an area representing the integral of said curve and an area representing the remaining part of said record between times $T_1$ and $T_2$, said method comprising the steps of measuring the capacity of said integral area with respect to an electrode whose area equals the total area of said record between times $T_1$ and $T_2$ and measuring the combined capacity of both of said areas with respect to said electrode.

2. A method as defined by claim 1 wherein said curve divides said record into two vertically displaced areas.

3. A method as defined by claim 1 wherein said curve divides said record into an area completely enclosed by said curve and representing said integral and an area unenclosed by said curve and representing the remaining area of said record.

4. Apparatus for measuring the integral of a curve varying with time between times $T_1$ and $T_2$ that comprises a metal coated record carrying said curve, said curve electrically dividing said record into at least two separate areas, namely an area representing said integral and an area representing the remaining part of said record, an insulating body covering said record between times $T_1$ and $T_2$ and a metal plate covering said insulating body between times $T_1$ and $T_2$, the integral area of said record constituting one plate of a first condenser and said metal plate constituting the other plate of said first condenser, the entire area of said record constituting one plate of a second condenser, said metal plate constituting the other plate of said second condenser, and means for comparing the capacities of said first and second condensers.

5. Apparatus as claimed in claim 4 wherein said last mentioned means includes conductors mounted to the various plates of said condensers.

6. Apparatus as claimed in claim 5 further including a plurality of contact heads having means to individually move said heads into and out of electrical contact with selected areas on said record and conductors electrically mounted to said heads.

References Cited in the file of this patent

UNITED STATES PATENTS

| Number | Name | Date |
|---|---|---|
| 912,181 | Schattner | Feb. 9, 1909 |
| 1,715,863 | Pomeroy | June 4, 1929 |
| 2,462,351 | Blau et al. | Feb. 22, 1949 |
| 2,544,673 | Haber | Mar. 13, 1951 |
| 2,649,573 | Goldberg et al. | Aug. 18, 1953 |